United States Patent [19]

Kowalski

[11] 4,146,074
[45] Mar. 27, 1979

[54] FASTENER

[75] Inventor: Joseph W. Kowalski, Florissant, Mo.

[73] Assignee: B-Line Systems, Inc., Highland, Ill.

[21] Appl. No.: 840,174

[22] Filed: Oct. 7, 1977

[51] Int. Cl.² ............................................ F16B 37/10
[52] U.S. Cl. ...................................... 151/41.75; 85/5 P
[58] Field of Search ......................... 151/41.75, 41.76;
85/32 K, 5 P; 52/34; 403/230, 231

[56] References Cited

U.S. PATENT DOCUMENTS

| | | | |
|---|---|---|---|
| 1,820,667 | 8/1931 | Leyes | 85/32 K UX |
| 2,767,609 | 10/1956 | Cousino | 151/41.75 X |
| 2,767,951 | 10/1956 | Cousino | 151/41.75 UX |
| 3,005,292 | 10/1961 | Reiland | 151/41.75 X |
| 3,429,601 | 2/1969 | Bremers | 151/41.75 UX |
| 3,483,910 | 12/1969 | Londe et al. | 151/41.75 |
| 3,493,025 | 2/1970 | Londe et al. | 151/41.75 |
| 3,680,620 | 8/1972 | Gotschel | 403/231 X |

FOREIGN PATENT DOCUMENTS 545898  6/1942  United Kingdom .................... 85/32 K

*Primary Examiner*—J. Franklin Foss
*Attorney, Agent, or Firm*—Koenig, Senniger, Powers and Leavitt

[57] ABSTRACT

A fastener for securing parts to metal framing such as channel framing having side flanges with inwardly turned, hook-shaped lips defining a slot therebetween. The fastener comprises an elongate body or nut having inside and outside faces, opposite sides and opposite ends, a width less than that of the slot and a length greater than that of the slot. The fastener also includes a clamp member carried on the outside face of the nut for engaging the curved outside faces of the channel lips. A retainer holds the clamp member in assembly with the nut and prevents relative lengthwise, lateral and rotational movement of the clamp member and the nut while permitting movement of the clamp member toward and away from the outside face of the nut. The retainer also has spring fingers engageable with the inside face of the nut whereby when the nut is generally aligned with, entered into and passed through the slot so that the clamp member engages the outside faces of the channel lips, and the nut is then turned to a crosswise position relative to the slot for engagement of the outside face of the nut with the inside faces of the channel lips, these spring fingers tend to draw the clamp member back toward the outside face of the nut thereby to clamp the clamp member and nut against respective outside and inside faces of the channel lips. A tool for installing the fastener on a channel is also disclosed.

15 Claims, 9 Drawing Figures

FASTENER

BACKGROUND OF THE INVENTION

This invention relates generally to fasteners for fastening objects to metal channel framing and, more particularly, to a nut having means thereon for clamping the nut to the channel prior to and during securement of the object to the channel.

Electrical conduit, pipes, fixtures, etc. are commonly supported overhead or vertically by channel framing conventionally having side flanges with inwardly turned, hook-shaped lips defining a slot therebetween. Typically, an elongate nut (narrower but longer than the slot) is used for securing objects to the framing, the nut first being aligned with, entered into and passed through the slot, and then turned 90° to a crosswise position with the outside face of the nut engaging the inside faces of the channel lips. Various means have heretofore been used for holding the nut against the channel in its crosswise position prior to and during securement of an object to the channel.

One such means is a coil compression spring on the inside face of the nut. Upon insertion of the nut into the channel, this spring reacts from the channel bottom and pushes the nut against the channel lips. This arrangement has several serious disadvantages, however, one being that each channel of different depth requires a spring of correspondingly different length, thus greatly increasing the number of fastener sizes which have to be stocked. Moreover, while securing parts to the framing, the nuts tend to tilt and topple over into the channel. It is also difficult to use the channel as a raceway for conduit, wires or the like since the spring substantially blocks the entire channel.

Other prior art devices utilize a coil spring attached to the outside face of the nut for spanning the channel and pulling the nut into engagement with the channel lips. This type of device also has its drawbacks, however, inasmuch as the spring tends to slip off the lips of the channel and the nut to fall into the channel.

Reference may be made to U.S. Pat. Nos. 1,306,100 and 3,483,910, and British Pat. Nos. 513,368 and 1,061,149, all of which disclose fasteners of the same general type of this invention.

SUMMARY OF THE INVENTION

Among the several objects of this invention may be noted the provision of a fastener which is readily installed on a channel and self-retaining thereafter; the provision of such a fastener which remains securely in place on the channel prior to and during securement of an object to the channel; the provision of such a fastener which provides a clear channel for carrying an increased number of conductors; the provision of such a fastener which fits channels of all depths, thus reducing the number of fastener sizes which need to be stocked; and the provision of a tool which quickly and easily installs a fastener of this invention on a channel.

Briefly, an improved fastener of this invention, which is useful for securing a part to metal framing having a slot and inside and outside faces on opposite sides of the slot, comprises an elongate body having an inside and an outside face, opposite sides and opposite ends. The width of the body is less than that of the slot in the framing whereby the body may be generally aligned with the slot, entered into the slot and passed through the slot from the outside to the inside of the framing and then turned to extend in crosswise position for engagement of portions of the outside face of the body adjacent the ends of the body with the inside face of the framing at opposite sides of the slot.

The fastener further includes means for clamping the body in place in the aforesaid crosswise position comprising a clamp member carried by the body on the outside face thereof for engagement with the outside face of the framing on opposite sides of the slot when the body is generally aligned with and entered into and passed through the slot and also when the body is turned to its crosswise position. A retaining means holds the clamp member in assembly with the body while permitting movement of the clamp member relative to the body between an extended position in which the clamp member is away from the outside face of the body and a retracted position wherein the clamp member is more closely adjacent the outside face of the body. The retaining means is interengageable with the body for preventing relative lengthwise, lateral and rotational movement of the clamp member and the body. The retaining means also has a portion bent to provide spring finger means engageable with the inside face of the body for providing a spring action tending to draw the clamp member back toward the outside face of the body for clamping the body and clamp member against the inside and outside faces of the framing on opposite sides of the slot.

A tool for installing a fastener of this invention on metal framing is engageable with the clamp member for turning the body to its crosswise position.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
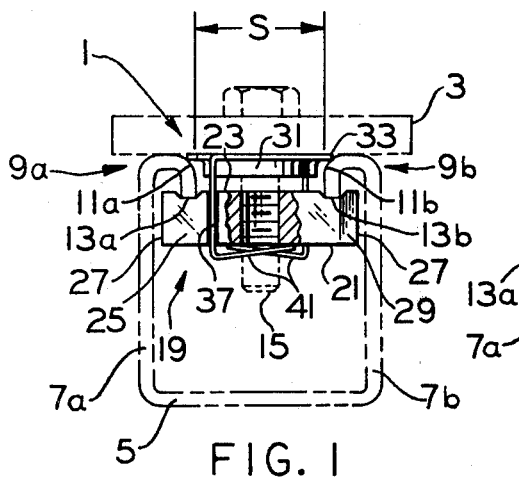
FIG. 1 is an elevation of a part secured to a channel frame by means of a fastener of this invention.
Figure 2:
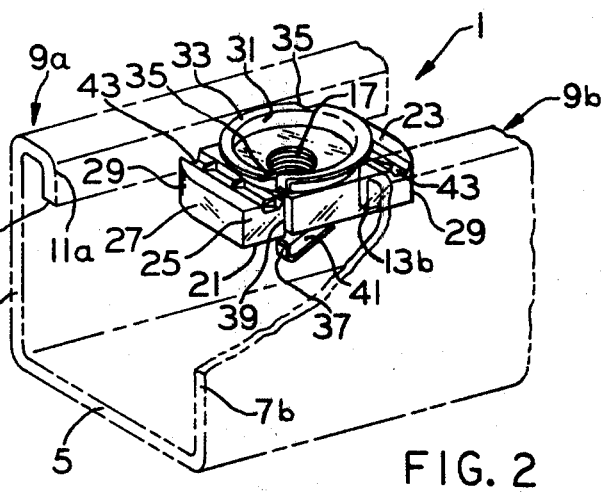
FIG. 2 is a perspective of the fastener shown in FIG. 1 illustrating one step in the installation of the fastener on the channel.
Figure 3:
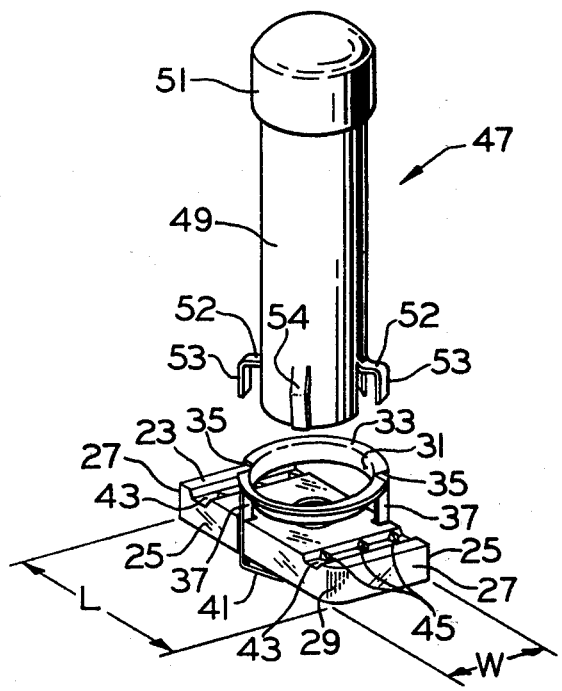
FIG. 3 is a perspective of the fastener shown in FIG. 1 and of a tool for installing the fastener on the channel.

Referring now to the drawings, particularly to FIGS. 1–3, a fastener of this invention is indicated in its entirety at 1 and is shown securing a part 3 (such as a bracket) to a metal channel frame or support 5. This channel has a pair of side flanges 7a, 7b, the outer ends of which have inwardly directed lips formed thereon as indicated generally at 9a and 9b. These lips are hook-shaped, having curved outside faces 11a, 11b terminating in inside edges 13a, 13b, and are spaced from one another to define a slot S therebetween which extends the length of the channel. As illustrated, part 3 spans slot S and bears on outside faces 11a, 11b of the channel lips at opposite sides of the slot, the part being locked in position by means of a conventional bolt 15 extending through the part and threaded into a tapped bore 17 in fastener 1.

More particularly, fastener 1 comprises an elongate body or nut generally designated 19 having an inside face 21, an outside face 23, opposite sides 25 and opposite ends 27. While the length L of nut 19 is greater than the width of channel slot S (but less than the distance between channel side flanges 7a, 7b), the width W of the nut is less than the width of slot S so that the nut may be inserted in and installed on the channel in a manner to be hereinafter described. Diagonally opposite corners of the nut are rounded as indicated at 29 for facilitating such installation.

Carried by nut 19 on the outside face 23 thereof is annular clamp member or ring 31 having an outer radial flange 33 for engaging the outside faces 11a, 11b of channel lips 9a, 9b on opposite sides of slot S. Flange 33 has two diametrically opposed notches 35 therein. For holding the ring 31 in assembly with the body, a retaining means is provided and is shown in FIGS. 1-3 to comprise a pair of guide members or arms, each designated 37, bent downwardly from the flange 33 adjacent the notches 35. These arms 37 are of one-piece construction with flange 33 and extend through narrow passages or grooves 39 in opposite sides 25 of and toward opposite ends 27 of nut 19. Thus, arms 37 are interengageable with the nut for preventing relative lengthwise, lateral and rotational movement of the ring 31 and nut 19 thereby to hold the ring captive on the nut. However, the arms 37 are slidable in grooves 39 for permitting relative movement of the ring 31 and the nut 19 between an extended position (see FIG. 1) in which the ring 31 is spaced away from the outside face 23 of the nut and a retracted position (see FIG. 2) wherein the ring is more clearly adjacent the outside face.

In accordance with this invention, arms 37, which are of resilient material such as tempered carbon 1060 steel, extend beyond the inside face 21 of nut 19 and have portions bent from their free ends forming fingers 41 angled back toward the inside face of the nut. With the flanged clamping ring 31 immediately adjacent the outside face 23 of the nut 19 (i.e., a retracted position; see FIG. 2), the space between the bottom of the ring and the tips of fingers 41 are approximately equal to the thickness of the nut, fingers 41 thus being unflexed or relaxed. However, with the fastener clamped onto channel 5 as shown in FIG. 1, ring 31 is spaced from the outside face 23 of nut 19 and fingers 41 are accordingly flexed away from the clamping ring toward the bottom of the channel. In this flexed condition, the fingers tend to force or bias the nut back toward ring 31 for clamping the nut and ring against respective inside edges 13a, 13b and outside faces 11a, 11b of channel lips 9a, 9b at opposite sides of slot S, the fingers thus constituting, in effect, a spring means.

To assure that fastener 1 remains in position (even on a vertical channel) prior to and during the securement of a part to the channel, the inside edges 13a, 13b of channel lips 9a, 9b are received in parallel slots 43 extending across the outside face 23 of the nut at opposite sides of bore 17, which slots have upstanding teeth 45 therein for providing a firm grip between nut 19 and the channel lips. Inasmuch as flange 33 lies below the plane tangent to the outside faces 11a, 11b of the channel lips, part 3 rests flush against the lips when bolted in position.

To install fastener 1 on channel 5, the nut 19 is aligned with, entered into and passed through slot S from the outside to the inside thereof until the undersurface of flange 33 on ring 31 engages the channel lip outside faces 11a, 11b (see FIG. 2). Nut 19 is then pushed toward the channel bottom (thus causing arms 37 to slide in grooves 39 and spring fingers 41 to flex) and then rotated a quarter turn to the right, or clockwise to a position in which the nut extends crosswise of slot S. The rounded corners 29 of the nut facilitate rotation of the nut to this crosswise position, further rotation being prevented by the unreduced corners which thus insure proper alignment of serrated slots 43 with channel edges 13a 13b and assist in holding nut 19 against further turning as bolt 15 is tightened. After the nut has been turned, it is released whereupon the flexed fingers 41 pressing against inside face 21 of the nut clamp the outside face 23 of the nut against channel lip edges 13a, 13b which are received in slots 43 as shown in FIG. 1. Fastener 1 may be quickly and easily removed from the channel (as for reuse) by simply reversing the steps as set out above.

Thus, it will be readily observed that the fastener 1 of this invention is readily installed on a channel support and self-retaining thereon after installation. Moreover, the fastener may be used with a channel of any depth and leaves the channel clear of obstructions for freely carrying conductors or the like.

A tool generally indicated at 47 for installing fastener 1 to channel 5 is shown in FIG. 3 to comprise a tube 49 having a cap 51 at one end thereof and at its other end a pair of opposed legs, each having an inner portion 52 projecting laterally from the tube and an outer end portion 53 extending generally perpendicularly from the inner portion. The tube has an outside diameter slightly less than the inside diameter of clamping ring 31 so that it may be inserted within the ring for engagement with the outside face 23 of nut 19. In that position, the outer end portions 53 of the legs fit inside notches 35 for turning the fastener. Installation of fastener 1 on the channel is then quickly and easily accomplished by pushing tube 49 and nut 19 toward the channel bottom and then rotating the tube by means of cap 51 in a clockwise direction until the nut is crosswise of the channel and in its clamping position. Abutment of the underside of inner portions 52 of the legs against ring 31 limits the relative movement between nut 19 and ring 31 to prevent excessive flexing of spring fingers 41. Two opposed tongues 54 (only one of which is shown) bent outwardly from tube 49 provide a snug fit between tool 47 and ring 31. It will, of course, be understood that fastener 1 may be installed on channel 3 without the use of a tool simply by using a thumb to depress the nut and to turn it into position.

Figure 4:
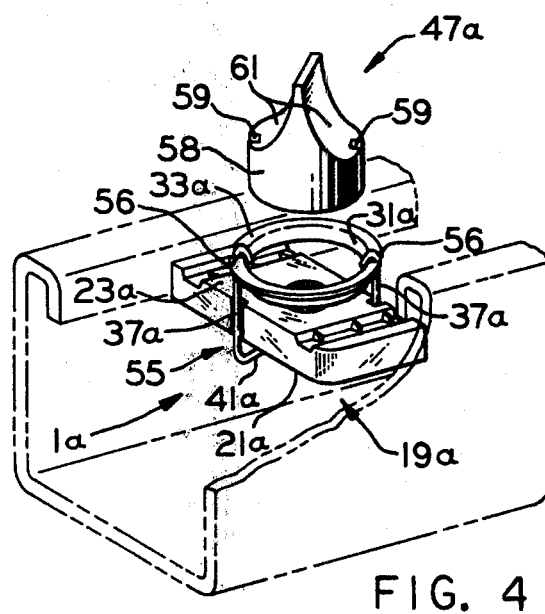
FIG. 4 is a perspective of an alternative fastener of this invention and of a tool for installing it on a channel frame.
Figure 5:
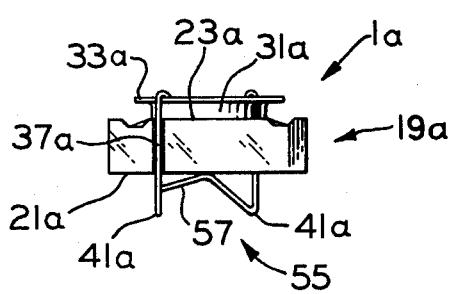
FIG. 5 is a left end elevation of the fastener of FIG. 4 showing it removed from the channel.
Figure 6:
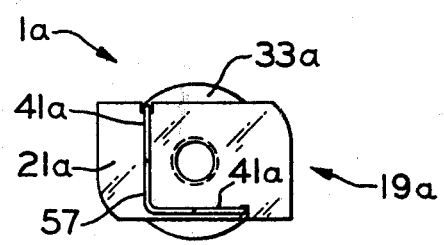
FIG. 6 is a view of the underside of the fastener shown in FIG. 5.

Referring now to FIGS. 4–6, another fastener of this invention is indicated generally at 1a and is identical to the fastener 1 previously described except that a separate, generally U-shaped spring wire, indicated in its entirety at 55, holds the nut 19a and clamping rings 31a in assembly, wire 55 thus constituting a retaining means. More particularly, spring wire 55 comprises a pair of arms, each indicated at 37a, which extend through notches or slots 56 in a radial flange 33a on the ring 31a and have hook-shaped ends hooked over the ring for securement of spring wire 55 thereto. Arms 37a project beyond the inside face 21a (undersurface) of nut 19a and have spring fingers 41a bent back toward the inside face for engagement therewith. As shown, one finger extends generally transversely of nut 19a and the other generally lengthwise of the nut. An L-shaped yoke portion 57 on the inside face 21a of nut 19a joins the two fingers 41a, the latter serving the same function and operating in the same fashion as fingers 41 described above.

Although fastener 1a may be installed on a channel by hand (i.e., with the thumb) in the same manner as fastener 1 on channel 3, a tool such as the one indicated at 47a in FIG. 4 may also be used. This tool comprises a generally cylindrical member 58 having an outside diameter less than the inside diameter of ring 31a for insertion of one end of the member inside the ring for engagement with outside face 23a of nut 19a. A pair of opposed open-ended axial slots 59 are provided in member 58 for receiving the hooked ends of wire 55 upon insertion of the tool inside clamping ring 31a. The other end of member 58 is tapered on opposite sides as indicated at 61 to form a diametric grip for readily turning tool 47a to install fastener 1a on a channel, such installation being accomplished in the same way as previously described with regard to fastener 1 and tool 47.

Figure 7:
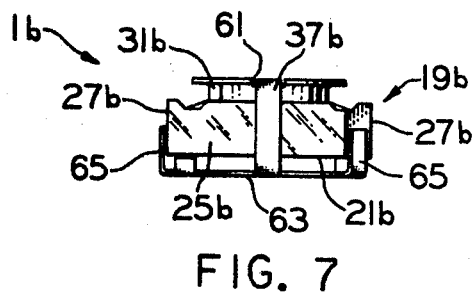
FIG. 7 is an elevation of another alternative fastener of this invention.
Figure 8:
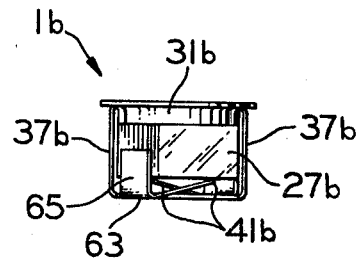
FIG. 8 is a right end elevation of the fastener shown in FIG. 7.
Figure 9:
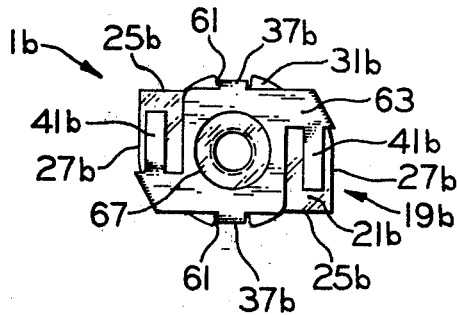
FIG. 9 is a view of the underside of the fastener shown in FIGS. 7 and 8.

Referring now to FIGs. 7–9, another fastener of this invention, indicated generally at 1b, is shown to comprise a nut 19b and flanged ring 31b identical to those described in the previous two embodiments. In this embodiment, a retaining means for holding the ring 31b in assembly with the nut 19b includes a pair of arms, each designated 37b, at opposite sides of the nut. These arms extend through notches or slots 61 in flange 33b and have hook-shaped ends hooked over ring 31b for securement thereto. At the inner ends of the arms 37b on the inside face 21b of the nut is a plate member 63 constituting a yoke connecting the arms and having two spring fingers 41b (which operate in the same fashion as fingers 41, 41a, previously described) extending integrally therefrom toward the inside face of the nut for engagement therewith. This plate member 63 has portions bent therefrom forming a pair of tabs, each indicated at 65, engageable with opposite ends 27b of the nut 19b for preventing relative lengthwise movement of the ring 31b and the nut. Thus, these tabs 65 eliminate the need for the arms 37b through slots in the sides of the nut as in fasteners 1 and 1a. Inasmuch as relative lateral and rotational movement of the ring 31b and the nut 19b is also prevented by interengagement between arms 37b and the sides 25b of the nut, it will be understood that the ring is held securely captive on the nut. An opening 67 in the center of the plate member 63 is also provided for allowing a bolt threaded in the nut 19b to pass through the plate member.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. For securement to metal framing having a slot and inside and outside faces on opposite sides of the slot for attachment of parts to the framing through the slot from the outside of the slot, a fastener comprising:

an elongate body having a first face constituting an inside face and an opposite face constituting an outside face, opposite sides, and opposite ends, the width of said body between said sides being less than the width of the slot in the framing whereby the body may be generally aligned with the slot, entered into the slot and passed through the slot from the outside to the inside of the framing and then turned to extend in crosswise position relative to the slot for engagement of portions of the outside face of the body adjacent the ends of the body with the inside face of the framing at opposite sides of the slot;

means for clamping the body in place in its said crosswise position comprising a clamp member carried by the body on the outside face of the body for engagement with the outside face of the framing on opposite sides of the slot when the body is generally aligned with and entered into and passed through the slot and also when the body is turned to its said crosswise position; and retaining means for holding the clamp member in assembly with the body while permitting movement of the clamp member relative to said body between an extended position in which the clamp member is spaced away from the outside face of the body and a retracted position wherein the clamp member is more closely adjacent the outside face of the body, said retaining means being interengageable with the body for (a) preventing relative lengthwise movement of the clamp member and the body, (b) preventing relative lateral movement of the clamp member and the body, and (c) preventing relative rotation of the clamp member and the body, said retaining means further having a portion bent to provide spring finger means engageable with the inside face of the body for providing a spring action tending to draw the clamp member in the direction back toward the outside face of the body for clampwise engagement of the body and clamp member with portions of the framing on opposite sides of the slot.

2. A fastener as set forth in claim 1 wherein said retaining means comprises guide members extending from the clamp member at opposite sides of the body through passages in the body and slidable in the passages for allowing said relative movement of the clamp member between said extended and retracted positions while preventing said relative lengthwise, lateral and rotational movement.

3. A fastener as set forth in claim 2 wherein said passages comprise a pair of grooves in said opposite sides of the body and toward said opposite ends of the body.

4. A fastener as set forth in claim 1 wherein said retaining means comprises guide members at opposite sides of the body and a plate member at the inner ends of the guide members on the inside face of the body, said plate member having portions engageable with opposite ends of the body for preventing said relative lengthwise movement.

5. A fastener as set forth in claim 1 wherein said retaining means includes a pair of guide members extending from opposite portions of said clamp member.

6. A fastener as set forth in claim 5 wherein said clamp member comprises a ring having an outer radial flange for engaging the outside face of said framing and said guide members comprise two arms extending from diametrically opposite portions of said flange.

7. A fastener as set forth in claim 6 wherein said spring finger means comprises a finger bent from the inner end of each of said arms, said fingers being engageable with the inner face of the body thereby to flex as the clamp member is moved away from its retracted and toward its extended position.

8. A fastener as set forth in claim 7 wherein said arms and clamp member are of one-piece construction.

9. A fastener as set forth in claim 7 wherein said clamp member and said arms are of separate construction and said retaining means further comprises a yoke portion connecting the arms on said inside face of the body.

10. A fastener as set forth in claim 9 wherein said arms extend through slots in said flange and have hook-shaped ends hooked over said ring for securement thereto.

11. A fastener as set forth in claim 4 wherein said clamp member comprises a ring having an outer radial flange for engaging the outside face of said framing and said guide members comprise two arms extending from diametrically opposite portions of said flange.

12. A fastener as set forth in claim 11 wherein said arms and clamp member are of separate construction.

13. A fastener as set forth in claim 12 wherein said arms extend through slots in said flange and have hook-shaped ends hooked over said ring for securement thereto.

14. A fastener as set forth in claim 4 wherein said spring finger means comprises a finger extending from said plate member toward the inside face of the body, said finger being engageable with the inner face of the body thereby to flex as the clamp member is moved away from its retracted and toward its extended position.

15. A fastener as set forth in claim 4 wherein said plate member portions comprise a pair of tabs engageable with opposite ends of the body for preventing said relative lengthwise movement.

* * * * *